R. U. DAY.
NUT LOCK.
APPLICATION FILED NOV. 6, 1918.
1,305,698.
Patented June 3, 1919.
Fig. 1.
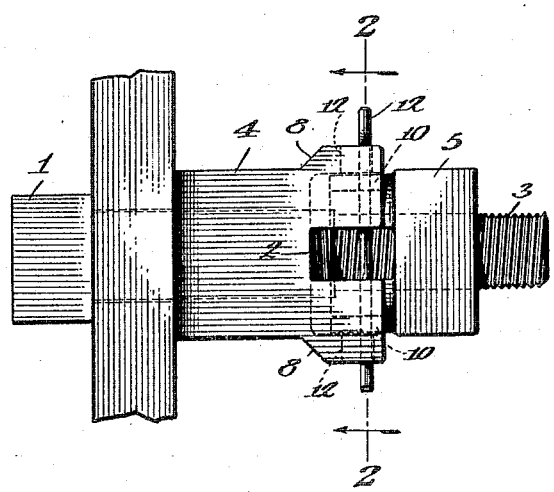
Fig. 2.
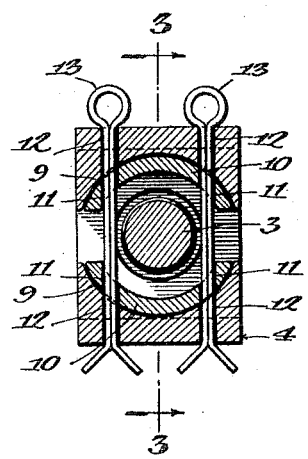
Fig. 3.
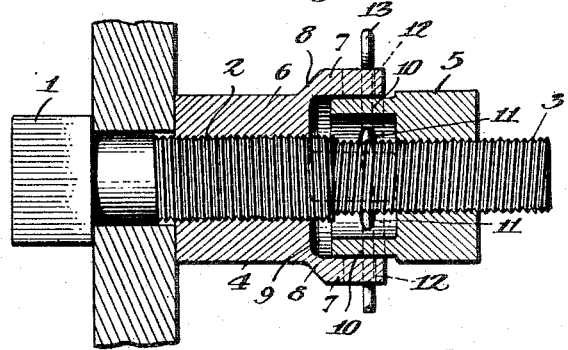
Fig. 6.
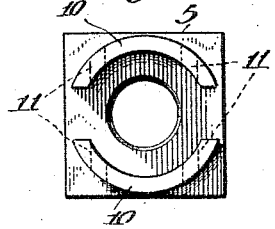
Fig. 4.
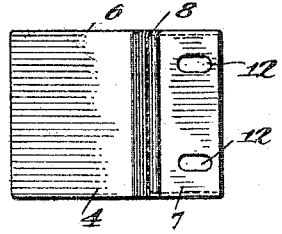
Fig. 5.
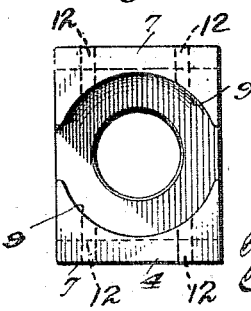
Fig. 7.
Inventor:
R. U. Day.

UNITED STATES PATENT OFFICE.

ROBERT U. DAY, OF STEPHENSON, MISSISSIPPI.

NUT-LOCK.

1,305,698.	Specification of Letters Patent.	Patented June 3, 1919.

Application filed November 6, 1918. Serial No. 261,383.

*To all whom it may concern:*

Be it known that I, ROBERT U. DAY, citizen of the United States, residing at Stephenson, in the county of Wilkinson and State of Mississippi, have invented certain new and useful Improvements in Nut-Locks, of which the following is a specification, reference being had therein to the accompanying drawings.

This invention relates to nut locks, and has for its object the construction of a simple and efficient nut lock which will securely retain a right-hand and a left-hand nut in an assembled position upon a bolt.

With this and other objects in view, the invention consists in general of certain novel combinations, constructions and arrangement of parts as will be hereinafter fully described and claimed.

In the drawings:

Figure 1 is a view in side elevation of the preferred embodiment of my nut lock.

Fig. 2 is a transverse sectional view taken on the line 2—2, Fig. 1, and looking in the direction of the arrows.

Fig. 3 is a longitudinal sectional view, taken on the line 3—3, Fig. 2, looking in the direction of the arrows.

Fig. 4 is a view in side elevation of the right-hand nut, while

Fig. 5 is an elevated front view of said nut.

Fig. 6 is a view in side elevation of the left-hand nut, while

Fig. 7 is a front view in elevation of said nut.

Referring to the drawings by numerals, 1 designates the bolt which is provided with a shank having a right-hand threaded portion 2 and a left-hand threaded portion 3.

Upon the right-hand threaded portion 2 is threaded the right-hand nut 4 and upon the left-hand threaded portion 3 is threaded the left-hand nut 5.

The right-hand nut 4 comprises a body 6 provided with end extensions 7, which extensions 7 are comparatively thick by reason of the body 6 being extended outwardly at 8, Figs. 1 and 3, and the inner face of each enlarged extension 7 is curved at 9 to accommodate the auxiliary curved extensions 10 on the inner end of the left-hand nut 5.

The curved extensions 10 of the left-hand nut 5 are each provided with apertures 11 that are adapted to register with the elongated apertures 12 formed in the primary extensions 7 of the right-hand nut 4.

I preferably use a pair of cotter pins 13, for fastening the two nuts together, the cotter pins 13 passing through the registering apertures 11 and 12 of the extensions 10 and 7 of the left-hand and right-hand nuts, respectively. One cotter pin 13 would secure the nuts in an assembled position, but to produce a highly efficient structure I found that two pins were preferable. The cotter pins 13 lie snug against the threads of the bolt, and when it is desired to remove the nut 5, or both nuts, all that is necessary is to remove the cotter pins 13 and then unscrew the outer or left-hand nut 5 and subsequently the inner or right-hand nut 4.

It is to be understood that the enlarging of the right-hand nut 4 at 8, and the forming of a curved face 9 on each extension 7 makes the structure strong and susceptible of receiving the pair of curved extensions 10 of nut 5, which extensions 10 are formed between the edges of the body of the left-hand nut 5 as clearly seen in Fig. 7.

What I claim is:

1. In a nut lock, the combination with a bolt provided with a right-hand and a left-hand threaded portion, of a right-hand nut threaded upon the right-hand threaded portion of the bolt, said nut comprising a body provided with an extension, a left-hand nut threaded upon the left-hand portion of the bolt, and provided with an extension, said extension of the left-hand nut adapted to rest coaxially with the extension of the right-hand nut when said nuts are assembled upon the bolt, and means extending through the extensions of both nuts and securing the same against independent rotary movement upon the bolt.

2. In a nut lock, the combination with a bolt provided with a right-hand and a left-hand threaded portion, a right-hand nut threaded upon the right-hand threaded portion of the bolt, said nut comprising a body portion wider at its outer end than its inner end and said wider part terminating in parallel extensions, each extension provided with an inner curved face and with a pair of parallel elongated apertures and the extensions being spaced apart, a left-hand nut threaded upon the left-hand portion of said bolt, said left-hand nut comprising a body provided on its inner end with a pair of curved extensions, and said extensions being spaced apart, said last-mentioned extensions being formed within the marginal edges of the body of the left-hand nut, and each extension having a pair of parallel apertures, the extensions on the right-hand nut adapted to overlap the extensions on the left-hand nut when the left-hand nut is screwed inwardly upon the left-hand threaded portion of the bolt, whereby the apertures of the extensions of both nuts are caused to register, and cotter pins positioned in the registered apertures of the extensions and normally engaging the threads upon the bolt, substantially as shown and described.

In testimony whereof I hereunto affix my signature.

ROBERT U. DAY.

Copies of this patent may be obtained for five cents each, by addressing the "Commissioner of Patents, Washington, D. C."